(12) United States Patent
Peschiutta

(10) Patent No.: US 8,579,382 B2
(45) Date of Patent: Nov. 12, 2013

(54) ROAD WHEEL ORNAMENT

(75) Inventor: Mark Peschiutta, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 410 days.

(21) Appl. No.: 12/787,384

(22) Filed: May 25, 2010

(65) Prior Publication Data

US 2011/0291465 A1 Dec. 1, 2011

(51) Int. Cl.
*B60B 7/06* (2006.01)
(52) U.S. Cl.
USPC ............................ 301/37.107; 301/37.106
(58) Field of Classification Search
CPC .................. B60B 7/061; B60B 7/065
USPC ............... 301/37.101, 37.28, 37.102, 37.106, 301/37.108, 37.109; 29/894.381; 362/500; 40/587; D12/211
See application file for complete search history.

(56) References Cited

U.S. PATENT DOCUMENTS

| 3,894,775 | A | * | 7/1975 | Christoph et al. | ......... 301/37.35 |
| 5,078,453 | A | | 1/1992 | Siwek | |
| 5,494,336 | A | | 2/1996 | Russell | |
| 5,803,552 | A | | 9/1998 | Kato et al. | |
| D406,093 | S | | 2/1999 | Wissen | |
| D437,276 | S | | 2/2001 | Hodges | |
| 6,517,168 | B1 | | 2/2003 | Van Houten | |
| D477,558 | S | | 7/2003 | Brintouch | |
| D481,346 | S | | 10/2003 | Vian | |
| 6,663,189 | B2 | * | 12/2003 | Enomoto et al. | ........... 301/37.36 |
| 6,688,703 | B1 | | 2/2004 | Wang | |
| 6,799,810 | B1 | | 10/2004 | Wang | |
| D504,375 | S | | 4/2005 | Hussaini | |
| D505,103 | S | | 5/2005 | Bentley | |
| D510,555 | S | | 10/2005 | Fowlkes | |
| D524,216 | S | | 7/2006 | Scheu | |
| D532,738 | S | | 11/2006 | Ettensberger | |
| 7,213,953 | B2 | * | 5/2007 | Washington | .................. 362/500 |
| D567,730 | S | | 4/2008 | Polka | |
| D567,731 | S | | 4/2008 | Polka | |

(Continued)

FOREIGN PATENT DOCUMENTS

| JP | 4203639 | 7/1992 |
| JP | 4314601 | 11/1992 |

(Continued)

OTHER PUBLICATIONS

"Motionlite retractable wheel puts the spotlight on your dubs", Website, Apr. 6, 2010, 18 pages, http://www.autoblog.com/2010/04/06/motionlite-retractable-wheel-puts-the-spotlight-on-your-dubs/.

(Continued)

*Primary Examiner* — Kip T Kotter
(74) *Attorney, Agent, or Firm* — Raymond L. Coppiellie; Brooks Kushman P.C.

(57) ABSTRACT

A road wheel includes an outboard surface; an ornament configured to attach to the outboard surface; a post formed with the ornament, configured to fasten to the wheel; and a key formed with the ornament, the key configured to mate with a cavity in the outboard surface. The key includes a semi-circular profile. The key further includes at least one node, protruding therefrom; the outboard surface of the wheel includes a receptacle configured to at least partially fit the node therein.

3 Claims, 7 Drawing Sheets

(56) References Cited

U.S. PATENT DOCUMENTS

| | | |
|---|---|---|
| D568,227 S | 5/2008 | Bogani |
| D576,095 S | 9/2008 | Chung |
| D578,459 S | 10/2008 | Hetrick |
| 7,452,037 B1 * | 11/2008 | Nunes .................. 301/37.31 |
| D589,427 S | 3/2009 | Scheu |
| D591,663 S | 5/2009 | Chung |
| D593,018 S | 5/2009 | Juergens |
| D595,203 S | 6/2009 | Rak |
| D617,251 S | 6/2010 | Zhao |
| D618,607 S | 6/2010 | Hilpert |
| D620,425 S | 7/2010 | Zhao |
| D623,114 S | 9/2010 | Geisler |
| D625,244 S | 10/2010 | Zhao |
| 7,841,670 B2 * | 11/2010 | Takeda et al. ............ 301/37.102 |
| 8,020,945 B2 * | 9/2011 | Takeda et al. ............ 301/37.371 |
| 8,201,894 B2 * | 6/2012 | Chinavare et al. ......... 301/37.28 |
| 2007/0018496 A1 | 1/2007 | McCorquodale |
| 2008/0272642 A1 | 11/2008 | Hsiao |
| 2008/0303338 A1 | 12/2008 | Takeda |
| 2009/0127920 A1 | 5/2009 | Takeda |
| 2010/0181821 A1 * | 7/2010 | Noriega .................. 301/5.1 |
| 2010/0231029 A1 * | 9/2010 | Russell .................. 301/37.31 |

FOREIGN PATENT DOCUMENTS

| | | | |
|---|---|---|---|
| JP | 2002079801 A | * | 3/2002 |
| JP | 2002192902 A | * | 7/2002 |
| JP | 2006218890 | | 8/2006 |
| JP | 2006306396 A | * | 11/2006 |
| JP | 2008247131 | | 10/2008 |

OTHER PUBLICATIONS

You Tube results page for "dubs wheels illuminating", Website, May 25, 2010, 2 pages, http://www.google.com/webhp?sourceid=navclient&ie=UTF-8#q=dubs+wheels+illuminating&hl=en&rlz=1R2ADRA_enUS353&prmd=v&source=univ&tbs=vid:1&tbo=u&ei=aDb8S-bjCoWMNv-sOckB&sa=X&oi=video_result_group&ct=title&resnum=4&ved=0CC4QqwQwAw&fp=3323078eec0754e.

* cited by examiner

ROAD WHEEL ORNAMENT

TECHNICAL FIELD

The present disclosure relates to vehicle road wheels having attachable ornaments and methods for manufacturing the same.

BACKGROUND

Modern vehicle wheels and wheel covers can add a significant aesthetic to the overall vehicle. Wheel covers are designed to complement the paint and/or trim on the vehicle body. Various designs include, for example, wheel covers having painted accents detailed on the surface of the cover or spinning elements attachable to the wheel. One design goal is to have a road wheel that has two different surface finishes on the same Class-A surface (e.g., a painted or chrome accent).

It is desirable to have flexible wheel or wheel cover platforms that can support various aesthetic arrangements. Interchangeable features can be configured to attach to the wheel cover thereby enabling various designs on the same wheel mold. The mechanisms for attaching these interchangeable features can be expensive, less than reliable or time consuming. For example, U.S. Pat. No. 6,517,168 titled "Wheel Cover Having Interchangeable Turbine Pocket Inserts" discloses a wheel cover with turbine pockets that snap into the wheel cover. The '168 Patent teaches against the use of separate fasteners to attach the turbine pockets to the wheel cover; however, the integral engagement features that enable the snap function place significant manufacturing demands on the assembly. The procedures for forming the turbine pockets and wheel cover are relatively more expensive since the design is complex. The attachment feature would be more reliable if separate fasteners were utilized. Moreover, achieving proper alignment can be time consuming.

Therefore, it is desirable to have a road wheel with interchangeable ornaments that are easily attachable to the wheel in a reliable fashion.

SUMMARY

The present invention may address one or more of the above-mentioned issues. Other features and/or advantages may become apparent from the description which follows.

Certain embodiments of the present invention relate to a road wheel, including: an outboard surface; an ornament configured to attach to the outboard surface; a post formed with the ornament, configured to fasten to the wheel; and a key formed with the ornament, the key configured to mate with a cavity in the outboard surface. The key includes a semi-circular profile. The key further includes at least one node, protruding therefrom; the outboard surface of the wheel includes a receptacle configured to at least partially fit the node therein.

Other embodiments of the present invention relate to a road wheel, having: an outboard surface; an ornament configured to attach to the outboard surface; a post formed with the ornament, configured to fasten to the wheel; and a key formed with the ornament, having a first portion on one side of the post and a second portion on another side of the post. The first and second portions of the key are configured to mate with a cavity in the outboard surface. The key includes at least one node, protruding therefrom. The outboard surface of the wheel includes a receptacle configured to at least partially fit the node therein.

Another embodiment of the present invention relates to a road wheel ornament configured to attach to an outboard surface of a wheel, the ornament including: a post configured to fasten to the wheel; and a key having a first portion on one side of the post and a second portion on another side of the post. The key includes a semi-circular profile. The first and second portions of the key are configured to mate with a cavity in a road wheel. The key includes at least one node, protruding therefrom configured to mate with a receptacle on an outboard surface of the wheel.

Other embodiments of the present invention relate to a method of manufacturing a vehicle road wheel, including: forming a wheel having an outboard surface with a first surface finish; forming an orifice in the wheel; forming a cavity in the outboard surface; providing an ornament having a second surface finish and a post fittable in the orifice; aligning a first and second portion of a key formed in the ornament with the cavity in the outboard surface; and fastening the ornament to the wheel through the orifice and post.

One advantage of the present teachings is that they disclose a road wheel with interchangeable ornaments that are easily and reliably attached to the wheel. The ornament design(s) enable a road wheel that has two different surface finishes on the same Class-A surface. For example, ornaments can have a painted or chrome surface.

Another advantage of the present disclosure is that it teaches an ornament that is easy to align with the wheel for attachment.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

The following description and adjoining figures pertain at least to vehicle road wheels, ornaments and methods for manufacturing the same. The disclosed wheels, ornaments and methods yield a road wheel with interchangeable ornaments that are easily and reliably attachable to the wheel. Some ornaments use separate fasteners to attach to the wheel. The ornament designs, however, minimize the number of fasteners required for the system as the receiving portion on the ornament includes a post that at least partially inserts into the wheel or wheel cover. Ergo, both the ornament and the wheel include receiving and penetrating members to effectuate a more robust connection.

Some of the disclosed ornaments also include additional protrusions that extend from the inboard surface of the ornament. These keys improve the fit between the ornament and wheel or wheel cover at least by increasing the contact surface between the ornament and outboard surface of the wheel. In some embodiments, the keys have a portion on each side of the post providing greater symmetry in the assembly. Additionally, some of the disclosed ornaments include elements that can assist in alignment and assembly (such as nodes formed on the inboard surface of the ornaments).

The ornaments are compatible with wheels and wheel covers. Ornaments can have a similar or dissimilar surface finish than the wheel. For example, in some embodiments the ornament has a chrome finish and the wheel as a matted finish. In another embodiment, the ornament has a matted finish and the wheel has a chrome finish. In another embodiment, the ornament includes an illumination element that enables the ornaments to selectively emit light. The disclosed wheels and wheel covers can be utilized with various road vehicles including motorcycles, cars, trucks, SUVs, and crossovers. The wheels and ornaments are compatible with wheels of different diameters and sizes, including for example, 14" through 26" wheels.

Figure 1:
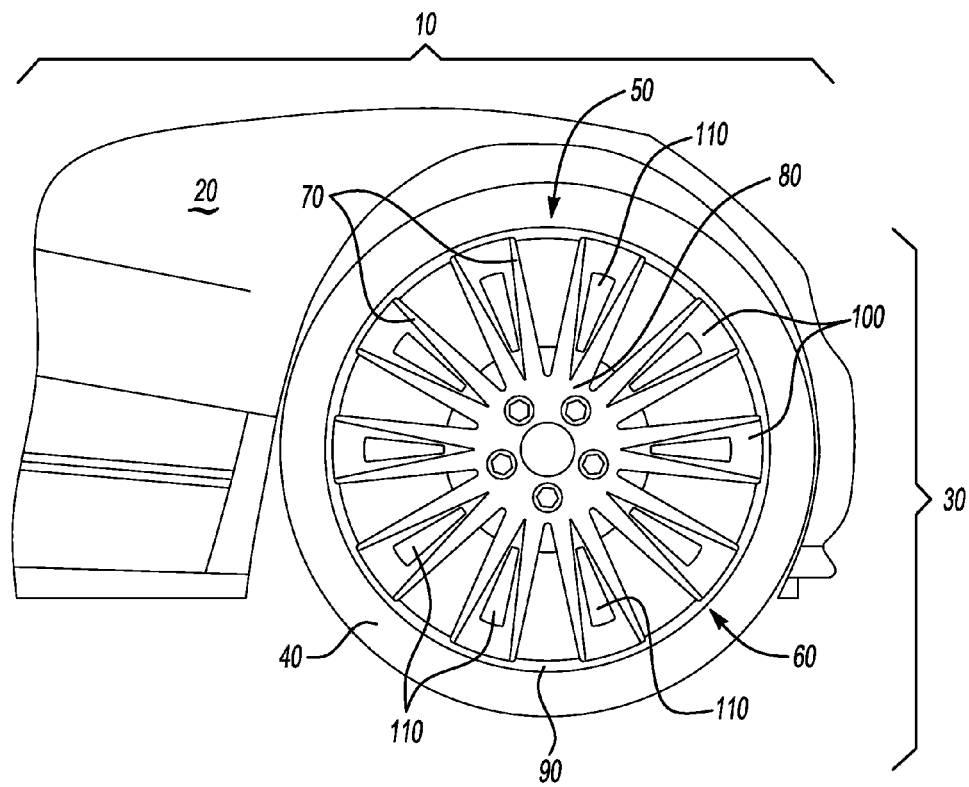
FIG. 1 is a side view of a front portion of a vehicle with an exemplary wheel.

Referring now to FIG. 1, there is shown therein a front portion of a vehicle 10. FIG. 1 shows a side view of a front passenger side of the vehicle 10. As shown, a side panel 20 of the vehicle body and partially encases a vehicle wheel assembly 30. The wheel assembly 30 includes a tire 40 journaled onto a wheel 50. The wheel 50 includes an outboard surface 60, as shown, and an inboard surface that faces the internal components of the vehicle when the wheel is assembled. Wheel 50 includes a series of spokes 70 that extend between the center 80 of the wheel and rim 90 of the wheel 50. Some of the spokes 70 include a cavity 100 formed therein that at least partially fit an ornament 110 or insert in the cavity 100. The ornaments 110 can be selectively attached to the wheel 50. In this embodiment, the ornaments 110 have a different surface finish than the outboard surface 60 of the wheel 50. For example, ornaments 110 have a chrome plated finish and wheel 50 has a painted cast aluminum finish. Ornaments 110 are attached to the road wheel 50 using a separate fastener as discussed hereinbelow. The wheel 50 is a molded assembly and can be composed (for example) of aluminum, an aluminum alloy or steel.

Figure 2:
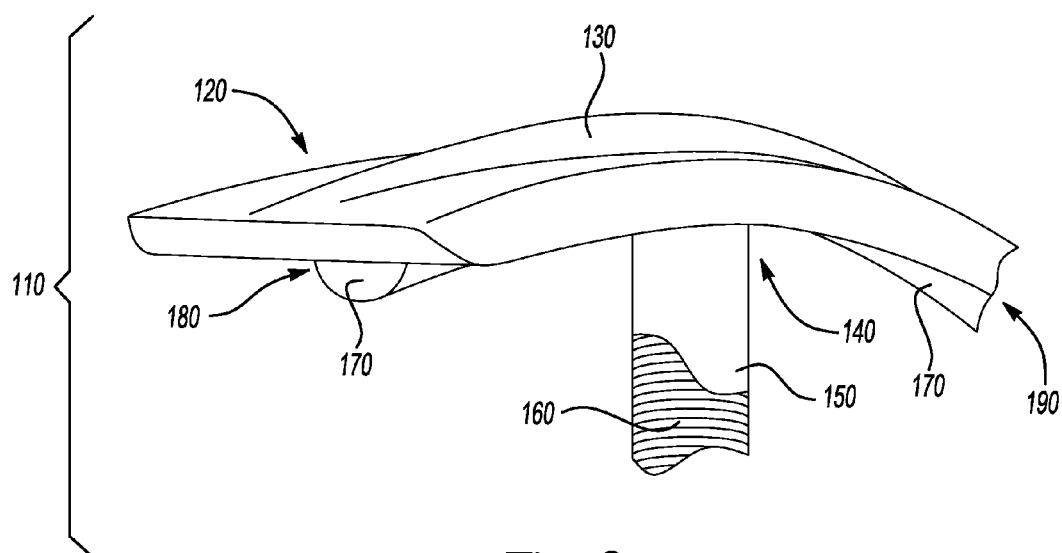
FIG. 2 is a perspective view of an ornament compatible with the wheel of FIG. 1.

Now with reference to FIG. 2, there is shown therein a perspective view of an ornament 110 compatible with the wheel 50 of FIG. 1. An outboard surface 120 of the ornament 110 includes a raised element 130. The raised surface 130 has a diamond-shaped profile. In another embodiment, the outboard surface 120 of the ornament 110 includes a depression or groove formed therein.

In the illustrated embodiment of FIG. 2, the ornament 110 has an inboard surface 140 that abuts the outboard surface of the wheel (e.g., 60 as shown in FIG. 1). In FIG. 2, the inboard surface 140 of the ornament 110 includes a post 150 that extends therefrom. Post 150 is a cylindrical member. Post 150 is configured to fit in an orifice formed in the outboard surface of the wheel. Post 150 thereby penetrates the wheel. Post 150 includes threads 160 formed in the inner surface so as to receive a screw. In another embodiment, post 150 is not pre-threaded or tapped by a secondary instrument. In that embodiment, the ornament 110 is composed of a sufficiently pliable material so as to accept a screw, be tapped by the screw and form a mating connection with the screw therefrom. For example, ornament 110 can be composed of a polymer.

The post 150, as shown in FIG. 2, is configured to receive a screw. In other embodiments, the post 150 can be configured to receive different fasteners. Other exemplary fasteners include rivets, Christmas tree fasteners, nuts and bolts, glues, epoxies, and clamps.

The ornament 110, as shown in FIG. 2, has a key 170 on the inboard surface 140 of the ornament. Key 170 is configured to mate with a cavity formed in the outboard surface of the wheel. Key 170 extends on two sides of the post 150 from one end of the ornament to another end of the ornament. Key 170 is symmetrical with respect to the post 150. The first portion 180 of the key 170 extends to a rim-side of the ornament and a second portion 190 of the key extends to a center-side of the ornament. In this embodiment, key 170 is a semi-circularly shaped protrusion and has a semi-circular profile. This shape supports a seamless mold for the ornament 110.

Figure 3:
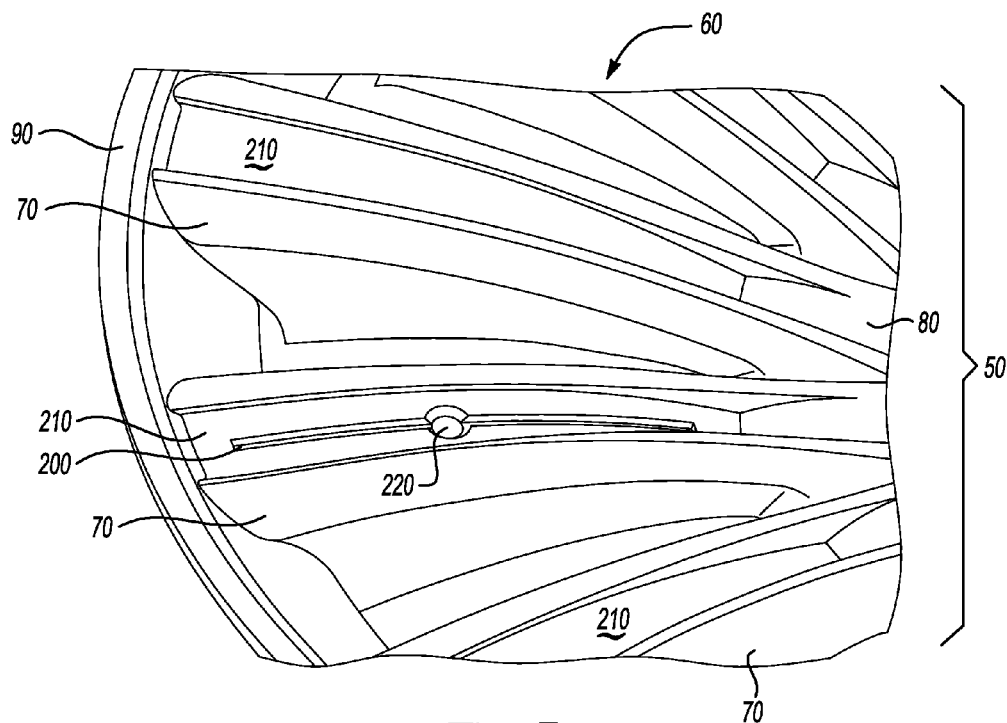
FIG. 3 is a perspective view of an outboard surface of the wheel of FIG. 1.

Key 170 is configured to fit in a slot 200 formed in the outboard surface 60 of the wheel 50 as shown in FIG. 3. FIG. 3 is a perspective view of an outboard surface 60 of the wheel 50 of FIG. 1 with the ornament detached from the wheel. As shown, the outboard surface 60 of the wheel includes various receiving members that support the attachment of the ornament 110 thereto. Wheel 50 includes a cavity 210 formed in the spokes 70. In the shown embodiment, cavity 210 gets progressively shallower. Near the center 80 of the wheel the cavity 210 is approximately 0.5 inch deep; near the rim 90 of the wheel cavity is approximately 0.125 inch deep. In other embodiments, cavity 210 is deeper at the rim 90 of the wheel 50 than the cavity is at the center 80 of the wheel. In some embodiments, the cavity 210 has a uniform depth between the rim 90 and center 80 of the wheel. The wheel 50 also includes an orifice 220 in the cavity. Orifice 220 can be machined or drilled into the wheel. Alternatively, orifice 220 can be included in the wheel 50 mold. Orifice 220 is configured to receive the post (150 as shown in FIG. 2) therein. Orifice 220, as shown in FIG. 3, has a slightly larger diameter than the outer diameter of the post. For example, orifice 220 is designed to have a diameter that is 0.05 inches larger than the post diameter. Orifice 220 extends from the outboard surface 60 of the wheel 50, through the wheel to the inboard surface of the wheel. The ornament 110 and wheel 50 can receive a separate fastener through orifice 220.

Referring again to the embodiment illustrated in FIG. 3, the outboard surface 60 of the wheel 50 includes the slot 200 formed in the center of the cavity 210. Slot 200 is rectangular in shape. Slot 200 is configured to at least partially fit the key 170 (as shown in FIG. 2) therein. Slot 200 has a uniform depth of approximately 0.25 inch in this embodiment.

Figure 4A:
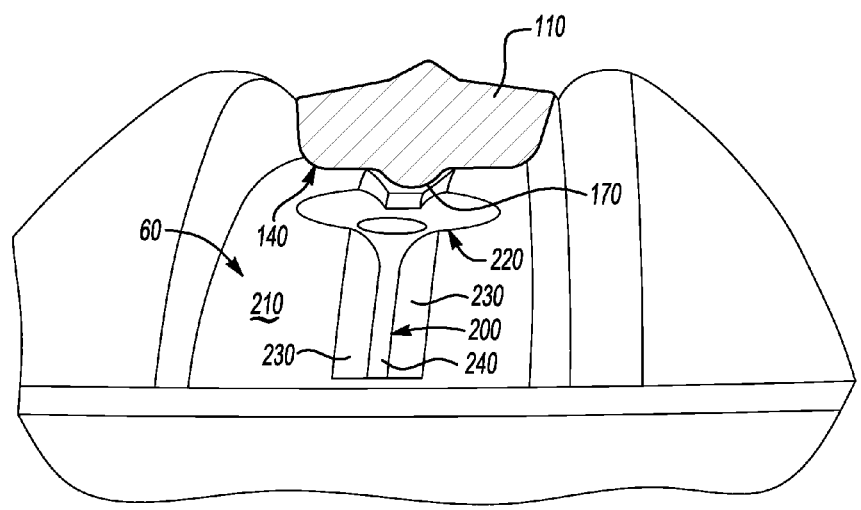
FIG. 4*a* is a perspective view of a tapered slot formed in the outboard surface of the wheel of FIG. 1.

As shown in FIG. 4a, slot 200 includes a tapered edge 230. Tapered edge 230 is tapered inward away from the cavity surface 210 to the base 240 of the slot. In the shown embodiment, the taper is approximately 45 degrees into a V-shaped slot. The rounded surface of the key 170 is configured so that the inboard surface 140 of the ornament 110 abuts or rests flush with the outboard surface 60 of the wheel when the ornament 110 is inserted in the cavity 210. At the inner most portion of the insert 110 the inboard surface 140 is offset from the outboard surface 60 of the wheel creating some spacing. Also shown in FIG. 4a, is a profile of the ornament 110 when inserted in the cavity 210. The key 170 fits within the slot 200 and is configured to mate with the slot. The post e.g., 150 as shown in FIG. 2) is configured to fit in the orifice 220 formed in the wheel cover.

Figure 4B:
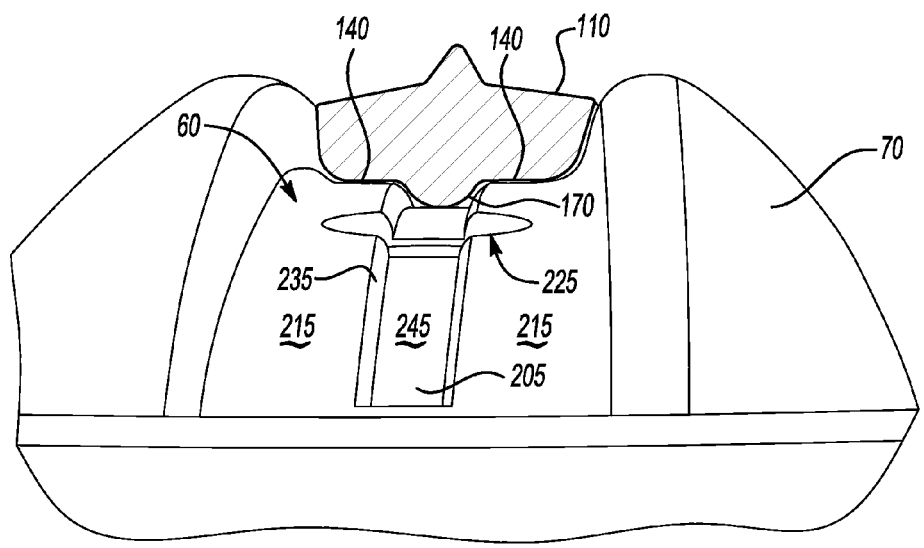
FIG. 4*b* is a perspective view of an alternative tapered slot formed in the outboard surface of a wheel.

An alternative slot 205 design can be formed into the outboard surface 60 of the wheel as shown in FIG. 4b. The key 170 is compatible with slot 205 which includes a tapered edge 235. Tapered edge 235 is tapered inward away from the cavity surface 215 to the base 245 of the slot. In the shown embodiment, the taper is approximately 15 degrees. The rounded surface of the key 170 is configured so that the inboard surface 140 of the ornament 110 abuts or rests flush with the outboard surface 60 of the wheel 50 when the ornament 110 is inserted in the cavity 215. Also shown in FIG. 4b, is a profile of the ornament 110 when inserted in the cavity 215. The key 170 fits within the slot 205 and is configured to mate with the slot. The post e.g., 150 as shown in FIG. 2) is configured to fit in the orifice 225 formed in the wheel cover.

Figure 5:
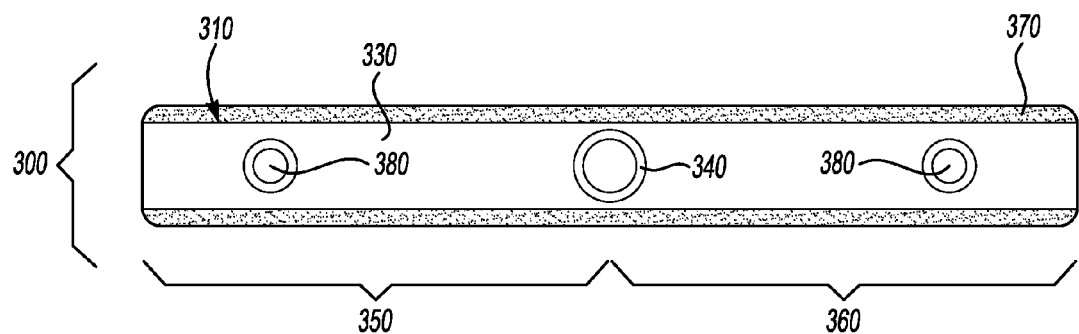
FIG. 5 is a side view of another exemplary wheel ornament.
Figure 6:
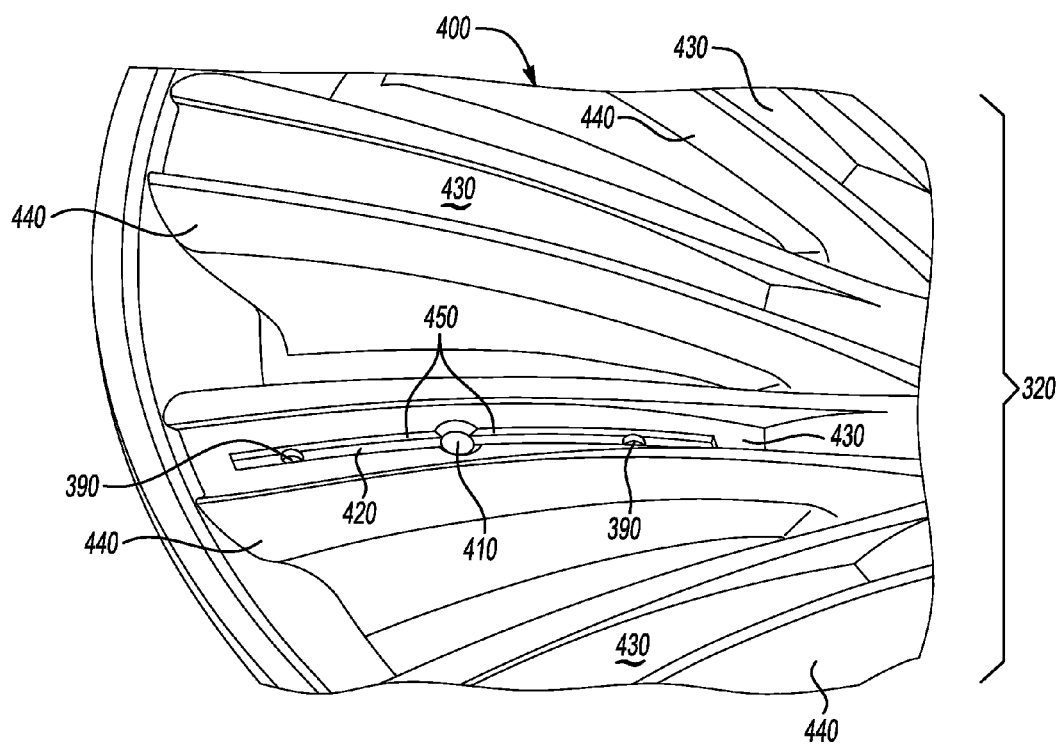
FIG. 6 is a perspective view of an outboard surface of a wheel compatible with the ornament of FIG. 5.

Referring now to FIGS. 5 and 6. In FIG. 5 there is shown a side view of another exemplary ornament 300. FIG. 5 shows the inboard side 310 of the ornament 300. The outboard surface of the ornament 300 can include a raised, flat or depressed surface. The outboard surface of the ornament 300 is designed to have a different surface finish than the wheel to which the ornament attaches (320 as partially shown in FIG. 6). In the inboard surface 310 of the ornament 300, the ornament includes a key 330 that is symmetrical with respect to a post 340. The key 330 is a raised surface that protrudes approximately 0.25 inch from the inboard surface of the ornament 300. The key 330 includes a first and second portion 350, 360; the key 330 is symmetrical with respect to the post 340. The first portion 350 of the key 330 extends to a rim-side of the ornament and the second portion 360 of the key 330 extends to a center-side of the ornament. In this embodiment, key 330 is a rectangular protrusion. A tapered edge 370 is included between the key 330 and inboard surface 310 of the ornament 300.

The key 330 includes two nodes 380 on each side of the post 340. Nodes 380 are, in this case, circular protrusions on the surface of the key 330. Nodes 380 are approximately 0.25 inches in diameter in this embodiment. Nodes 380 mate with a receptacle 390 formed in the outboard surface 400 of the wheel 320. In this manner, nodes 380 act as an alignment feature. Nodes 380 can be larger or smaller in size than the nodes shown in the illustrated embodiments. For manufacture, the key 330 and nodes 380 can be included in the mold cavity for the ornament 300 and formed therewith. Alternatively, key 330 and nodes 380 can be affixed to the ornament 300 or machined out of the ornament, for example.

The ornament 300 includes a post 340, as shown in FIG. 5. Post 340 extends from the inboard surface 310 of the ornament 300 and in this embodiment is a cylindrical member. Post 340 is configured to fit in an orifice 410 formed in the outboard surface 400 of the wheel 320. Post 340 thereby penetrates the wheel 320. Post 340 includes threads formed in the inner surface so as to receive a screw. Post 340 can be configured to receive different fasteners as well.

Key 330 is configured to fit in a slot 420 formed in the outboard surface 400 of the wheel 320 as shown in FIG. 6. FIG. 6 is a perspective view of an outboard surface 400 of a wheel 320 with the ornament detached from the wheel. As shown, the outboard surface 400 of the wheel 320 includes various receiving members that support the attachment of the ornament 300 thereto. Wheel 320 includes a cavity 430 formed in the spokes 440. In the shown embodiment, cavity 430 gets progressively shallower. Orifice 410 is formed in the wheel 320 and configured to receive the post 340 therein. Orifice 410 has a slightly larger diameter than the outer diameter of the post 340.

Referring again to the embodiment illustrated in FIG. 6, the outboard surface 400 of the wheel 320 includes a slot 420 formed in the center of the cavity 430. Slot 420 is rectangular in shape. Slot 420 is configured to at least partially fit the key 330 (as shown in FIG. 5) therein. Slot 420 also includes two receptacles 390 formed on each side of the orifice 410. Receptacles 390 are configured to fit the nodes 380 therein. Nodes 380 and receptacles 390 are of compatible geometries so that the inboard surface 310 of the ornament 300 can rest flush with respect to the outboard surface 400 of the wheel 320 when the ornament is properly aligned with and inserted in the wheel cavity 430.

As shown in FIG. 6, slot includes a tapered edge 450. Tapered edge 450 is tapered inward away from the cavity 430 surface to the base of the slot. In the shown embodiment, the taper is approximately 15 degrees and matches the tapered surface 370 on key.

Figure 7:
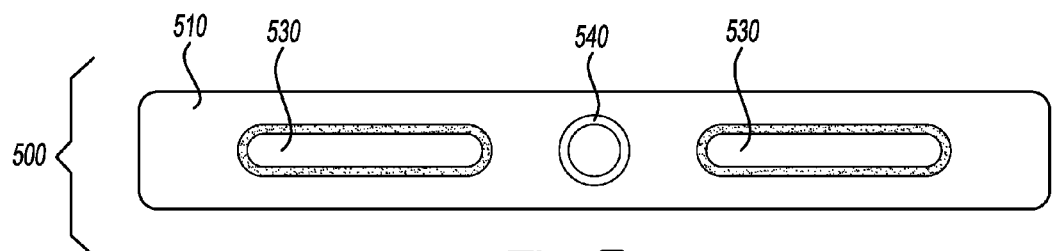
FIG. 7 is a side view of another exemplary wheel ornament.
Figure 8:
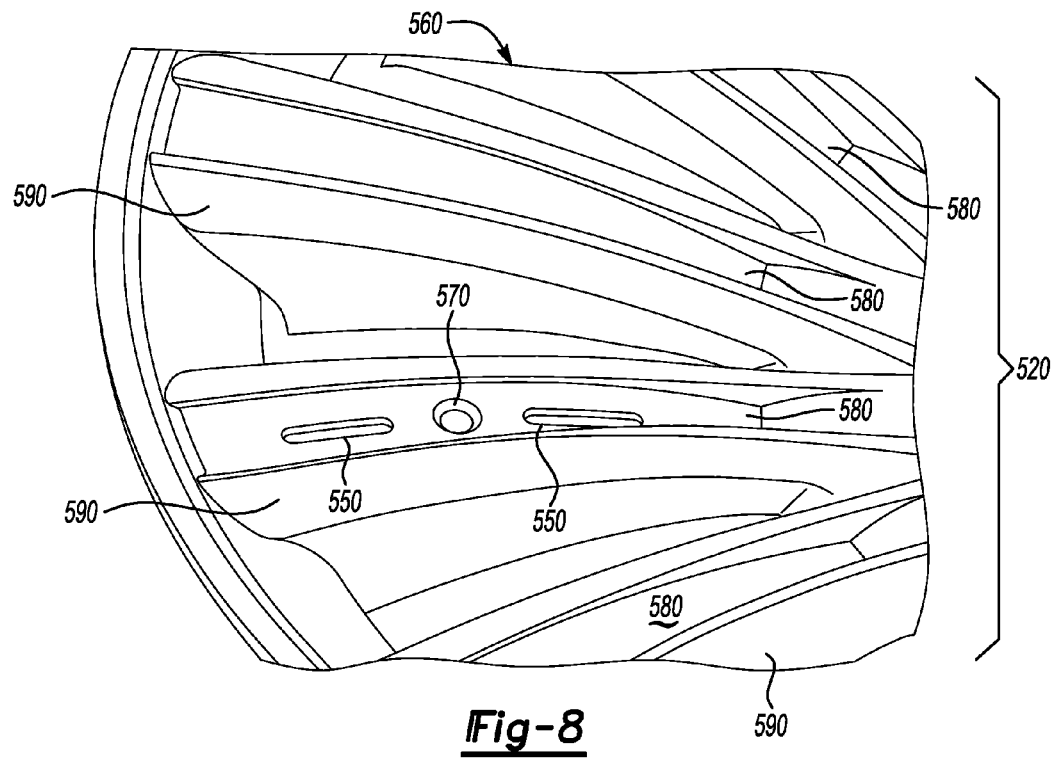
FIG. 8 is a perspective view of an outboard surface of a wheel compatible with the ornament of FIG. 7.

Referring now to FIGS. 7 and 8. In FIG. 7 there is shown a side view of another exemplary ornament 500. FIG. 7 shows the inboard surface 510 of the ornament 500. The outboard surface of the ornament can include a raised, flat or depressed surface. The outboard surface of the ornament is designed to have a different surface finish than the wheel 520 to which the ornament attaches (as partially shown in FIG. 8).

The inboard surface 510 of the ornament 500, shown in FIG. 7, includes two nodes 530 on each side of a post 540. Nodes 530 are, in this case, elliptical protrusions on the surface of the ornament 500. Nodes 530 are approximately 0.25 inch in width and 2 inches in length in this embodiment. Nodes 530 mate with a receptacle 550 formed in the outboard surface 560 of the wheel 520 (as shown in FIG. 8). In this manner, nodes 530 act as an alignment feature. Nodes 530 can be larger or smaller in size than the nodes shown in the illustrated embodiments. For manufacture, the nodes 530 can be included in the mold cavity for the ornament 500 and formed therewith. Alternatively, nodes 530 can be affixed to the ornament 500 or carved out of the ornament, for example.

In this embodiment, the ornament 500 includes a post 540, as shown in FIG. 7. Post 540 extends from the inboard surface 510 of the ornament 500 and in this embodiment is a cylindrical member. Post 540 is configured to fit in an orifice 570 formed in the outboard surface 560 of the wheel 520. Post 540 thereby penetrates the wheel 320. Post 540 includes threads formed in the inner surface so as to receive a screw. Post 540 can be configured to receive different fasteners as well.

Ornament 500 is configured to fit in a cavity 580 formed in the outboard surface 560 of the wheel 520 as shown in FIG. 8.

FIG. 8 is a perspective view of an outboard surface 560 of a wheel 520 with the ornament 500 detached from the wheel. As shown, wheel 520 includes the cavity 580 formed in the spokes 590. In the shown embodiment, cavity 580 gets progressively shallower. Orifice 570 is formed in the wheel 520 and configured to receive the post 540 therein. Orifice 570 has a slightly larger diameter than the outer diameter of the post 540.

Referring again to the embodiment illustrated in FIG. 8, receptacles 550 are configured to fit the nodes 530 therein. Nodes 530 and receptacles 550 are of compatible geometries so that the inboard surface 510 of the ornament can rest flush with respect to the outboard surface 560 of the wheel 520 when the ornament 500 is properly aligned with and inserted in the wheel cavity 580. In this embodiment, the node 530 protrudes approximately 0.125 inch from the inboard surface 510 of the ornament 500. Receptacles 550 are of approximately the same depth (0.125 inch).

Figure 9:
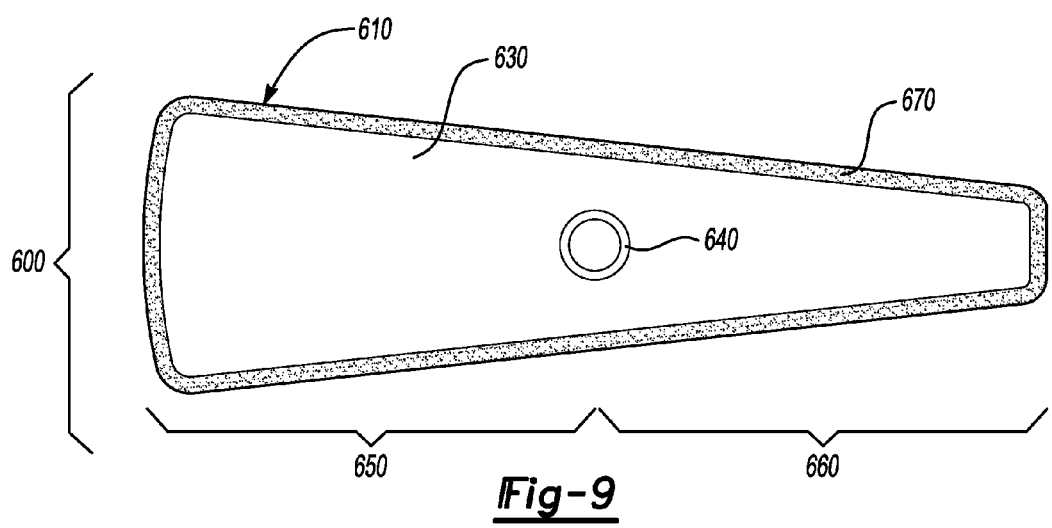
FIG. 9 is a side view of another exemplary wheel ornament.
Figure 10:
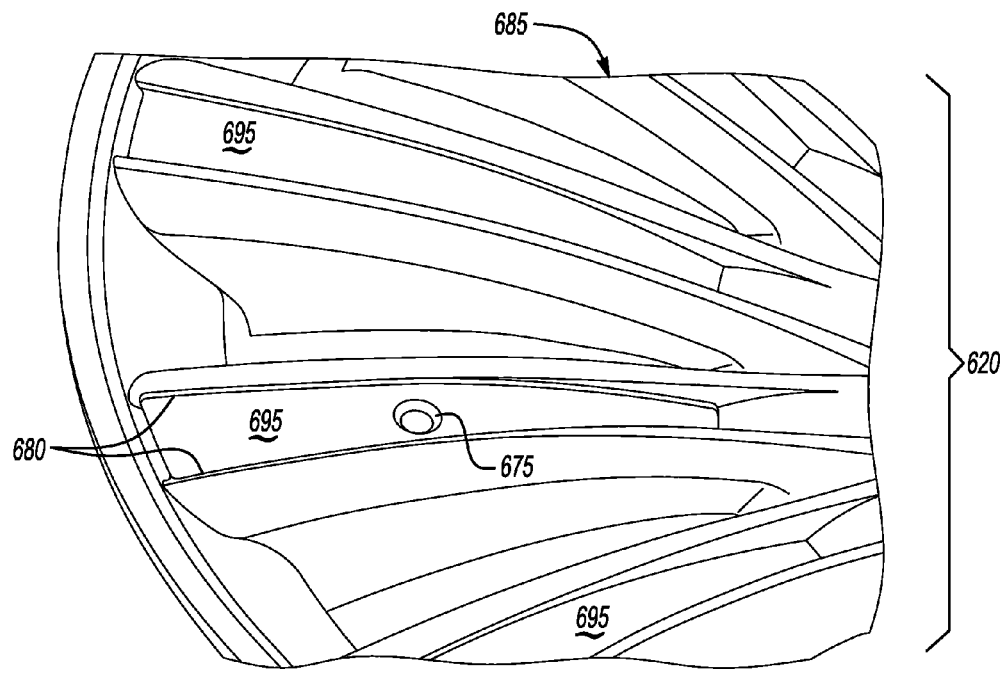
FIG. 10 is a perspective view of an outboard surface of a wheel compatible with the ornament of FIG. 9.

Referring now to FIGS. 9 and 10. In FIG. 9 there is shown a side view of another exemplary ornament 600. FIG. 9 shows the inboard side 610 of the ornament 600. The outboard surface of the ornament can include a raised, flat or depressed surface. The outboard surface of the ornament is designed to have a different surface finish than the wheel 620 to which the ornament 600 attaches (as partially shown in FIG. 10). In the inboard surface 610 of the ornament 600, the ornament includes a key 630 that is asymmetrical with respect to a post 640. The key 630 is a raised surface that protrudes approximately 0.25 inch from the inboard surface 610 of the ornament 600. The key 630 is triangular in shape. A first, wider portion 650 of the key extends to a rim-side of the ornament and a second, narrower portion 660 of the key 630 extends to a center-side of the ornament 600. In this embodiment, key 630 is a triangular protrusion. A tapered edge 670 is included between the key 630 and inboard surface 610 of the ornament. Key 630 can be included in the mold cavity for the ornament 600 and formed therewith. Alternatively, key 630 can be affixed to the ornament 600 or carved out of the ornament, for example.

The ornament 600 includes a post 640, as shown in FIG. 5. Post 640 extends from the inboard surface 610 of the ornament 600 and in this embodiment is a cylindrical member. Post 640 is configured to fit in an orifice 675 formed in the outboard surface 685 of the wheel 620. Post 640 thereby penetrates the wheel 620. Post 640 includes threads formed in the inner surface so as to receive a screw. Post 640 can be configured to receive different fasteners as well.

Key 630 is configured to fit in a triangular cavity 695 formed in the outboard surface 685 of the wheel 620 as shown in FIG. 10. FIG. 10 is a perspective view of an outboard surface 685 of the wheel 620 with the ornament 600 detached from the wheel.

As shown in FIG. 10, cavity 695 includes a tapered edge 680. Tapered edge 680 is tapered inward towards the base of the cavity 695. In the shown embodiment, the taper is approximately 15 degrees and matches the tapered surface on key 630 of the ornament 600. Key 630 can have other shapes and profiles as well. In another embodiment, key is of a diamond shape. In another embodiment, key has a jagged profile and wheel includes a mating jagged profile, formed on the outboard surface of the wheel that is compatible with the key.

Ornaments can have various surface finishes or treatments. In some exemplary embodiments, the outboard surface of the ornament is chrome plated. In other embodiments, the ornaments are gold plated, platinum plated, nickel plated and/or aluminum plated. In another embodiment, the ornaments are painted and color coated. The ornaments can be coordinated to accent the vehicle body. For example, in a blue vehicle the ornaments are colored with blue vehicle paint.

Figure 11:
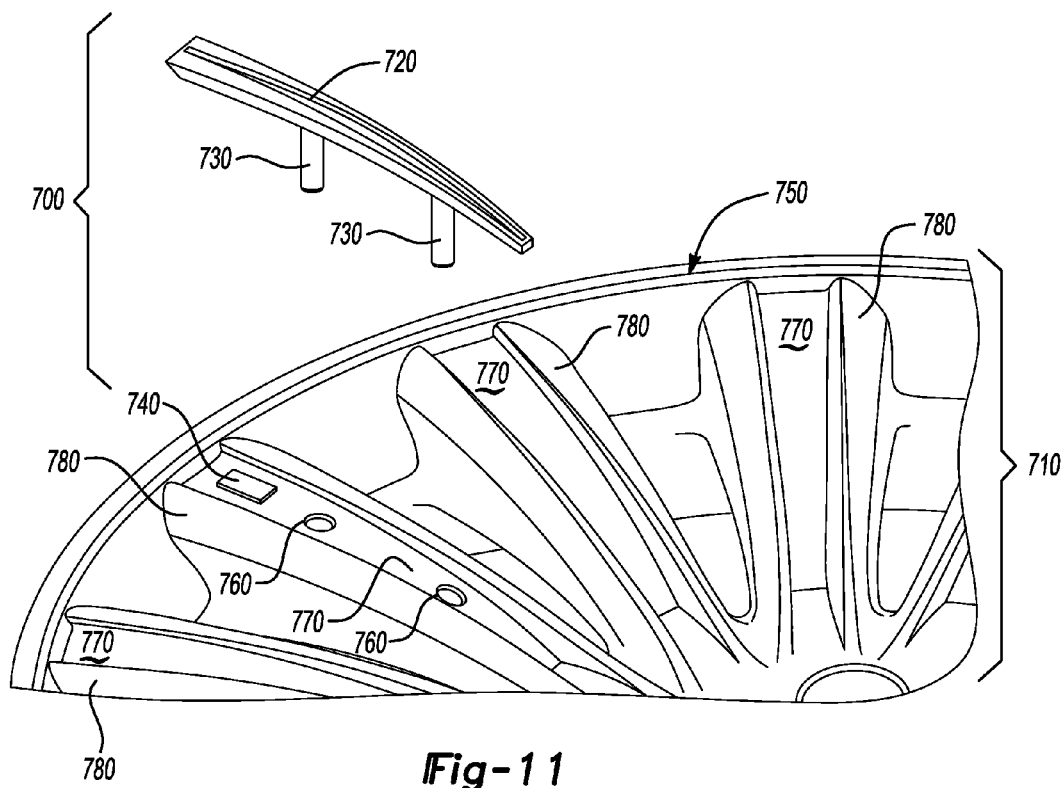
FIG. 11 is a perspective view of another exemplary wheel and compatible ornament.

Referring now to yet another illustrated exemplary ornament 700 and wheel 710 as shown in FIG. 11. FIG. 11 illustrates a perspective view of another ornament 700 having an illumination element 720 on the outboard surface of the ornament 700 and a plurality of posts 730 on the inboard surface of the ornament. An outboard surface of the ornament includes an illumination element 720. The illumination element 720 is a light emitting diode (or LED). A power source 740 is attached to the outboard surface 750 of the wheel 710. The ornament 700 includes electrical contacts on the inboard surface of the ornament. In another embodiment, a power source is included in the ornament to provide electricity to the illumination element. Alternatively the ornaments can be linked to the vehicle's main battery. The inboard surface of the wheel includes a port with electrical connections for each of the ornaments.

Illumination element 720, as shown in FIG. 11, can be configured to emit any number of colors or to emit a white light. Moreover, the color of the illuminating elements 720 can be designed to match or complement the exterior paint of the vehicle. For example, a red vehicle might have red or pink LEDs in each ornament. Or a black vehicle can have white LEDs included in the ornaments 700. A mother of pearl vehicle can have blue illumination elements in the wheel ornaments 700. Illumination elements 720 can be blended or mixed as well. For example, in a wheel having ten ornaments with illumination elements half of the ornaments can include blue LEDs and half of the ornaments can include red LEDs. When the wheels are in motion the visual effect would be a purple emission of light.

In another embodiment, the illumination element 720 is light-sensitive and self-sustaining. A separate power source is not needed. In the day time with full sunlight, illumination elements do not emit any light. In the evenings, illumination elements naturally emit a light therefrom. Illumination elements can be composed of a material that is phosphorescent, such as e.g., materials including zinc sulfide or strontium aluminate. Eligible material selections include any materials capable of absorbing radiation during sunlight hours.

In the illustrated embodiment of FIG. 11, the ornament 700 has an inboard surface that includes a plurality of posts 730 that extend therefrom. Two cylindrical posts 730 are shown. Posts 730 are configured to fit in two orifices 760 formed in the outboard surface 750 of the wheel 710. Post 730 includes threads formed in the inner surface so as to receive screws.

As shown in FIG. 11, the outboard surface 750 of the wheel includes a cavity 770 formed in the spokes 780. In the shown embodiment, cavity 770 gets progressively shallower. Two orifices 760 that are slightly larger in diameter than the posts 730 are formed in the wheel 710. Wheel 710 receives posts 730 in orifices 760. A fastener, e.g., a screw, is screwed into each post on the inboard side of the wheel 710 to secure the ornaments 700 to the wheel.

Figure 12:
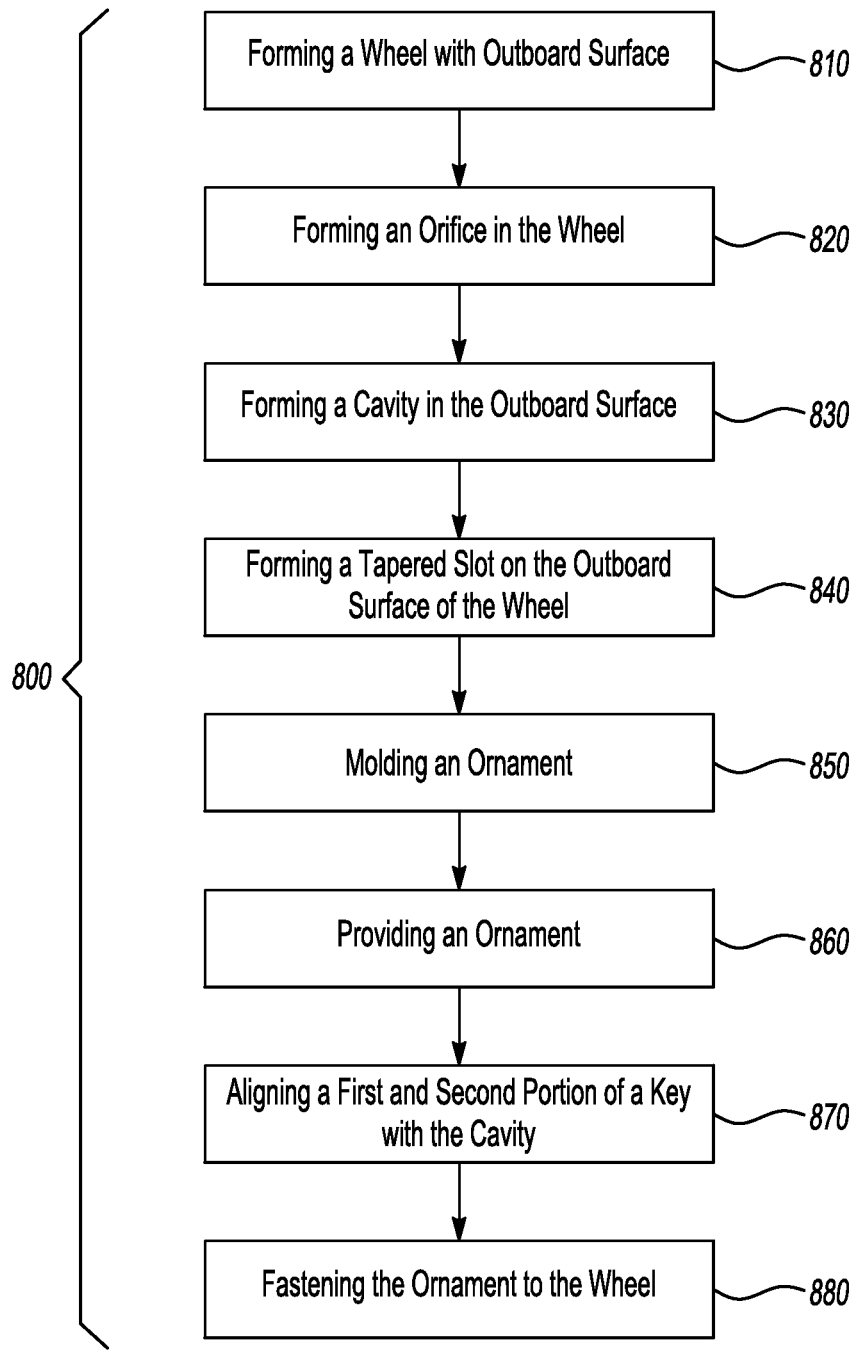
FIG. 12 is a flow chart of a method of manufacturing a vehicle road wheel.

Now with reference to FIG. 12, a method of manufacturing a vehicle road wheel 800 is illustrated. The method includes manufacturing steps that can be applied to the embodiments shown in FIGS. 1-11 or other versions of the ornaments and wheels as well. The steps can be performed in any order or simultaneously. The method includes the step of forming a wheel having an outboard surface with a first surface finish 810. The wheel can be die-cast, for example. Moreover, step 810 applies to forming a wheel or wheel cover. Step 820 involves forming an orifice in the wheel. The orifice should be sufficiently large to receive a penetrating element (e.g., a post 150 as shown in FIG. 2) from the ornament therein. At step 830 the method of manufacture includes forming a cavity in the outboard surface of the wheel. The cavity can be included in the die for the wheel and formed with the wheel. In the illustrated embodiment, the method includes forming a tapered slot on the outboard surface of the wheel 840. The slot can be, for example, the slot 200 as shown in FIG. 3. All steps associated with features in the wheel can be formed in one process such as when the wheel is cast. An ornament can be molded or provided for the assembly. In this embodiment, the method includes molding an ornament 850. Various features of the ornament can be formed with the ornament through incorporation in the ornament mold (such as e.g., the posts, keys and nodes). Ornament can be, for example, injection molded or die cast. Ornament is composed of a polymer. In other embodiments, ornament is composed of an aluminum alloy or resin. At step 860 the method includes providing an ornament having a second surface finish and a post fittable in the orifice. The ornament is configured to at least partially fit in the cavity formed in the outboard surface of the wheel. At step 870 the method includes aligning a first and second portion of a key formed with the ornament in the cavity in the outboard surface so that the key rests flush with the outboard surface when the key is inserted in the cavity. At step 880 the ornament is fastened to the wheel through the orifice and post. The ornament can be, for example, screwed or riveted to the wheel.

It will be apparent to those skilled in the art that various modifications and variations can be made to the methodologies of the present invention without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

I claim:

1. A method of manufacturing a vehicle road wheel, comprising:
   forming a wheel having an outboard surface with a first surface finish;
   forming an orifice in the wheel;
   forming a cavity in the outboard surface;
   providing an ornament having a second surface finish and a post fittable in the orifice;
   aligning a first and second portion of a key formed in the ornament with the cavity in the outboard surface;
   forming the key to have a semi-circular profile; and
   fastening the ornament to the wheel through the orifice and post.

2. The method of claim 1, further comprising:
   forming a tapered slot on the outboard surface of the wheel matable with the key.

3. The method of claim 1, further comprising:
   molding the ornament.

* * * * *